United States Patent [19]

Kato

[11] Patent Number: 5,272,483
[45] Date of Patent: Dec. 21, 1993

[54] NAVIGATION SYSTEM
[75] Inventor: Takahiro Kato, Kawagoe, Japan
[73] Assignee: Pioneer Electronic Corporation, Tokyo, Japan
[21] Appl. No.: 911,002
[22] Filed: Jul. 9, 1992
[30] Foreign Application Priority Data Jul. 10, 1991 [JP] Japan .................. 3-170057

[51] Int. Cl.$^5$ .................. H04B 7/185; G01S 5/02
[52] U.S. Cl. .................. 342/357
[58] Field of Search .................. 342/357; 364/449

[56] References Cited

U.S. PATENT DOCUMENTS 4,743,913 5/1988 Takai .................. 342/357

Primary Examiner—Theodore M. Blum
Attorney, Agent, or Firm—Kane, Dalsimer, Sullivan, Kurucz, Levy, Eisele and Richard

[57] ABSTRACT

A navigation system for use on an automobile, for example, has a GPS receiver for receiving radio waves from GPS satellites, determining the present position of the mobile object based on the received radio waves, and outputting first positional data indicative of the determined position, and a self-operating positioning device for determining the present position of the mobile object based on signals from speed and orientation sensors on the automobile and outputting second positional data indicative of the determined position. The navigation system also has a data processor for comparing the first positional data and said second positional data to determine whether or not the difference between the present position of the mobile object as indicated by said first positional data and the present position of the mobile object as indicated by said second positional data is equal to or greater than a predetermined value, and for adding an offset value to said first positional data if said difference is equal to or greater than said predetermined value.

14 Claims, 7 Drawing Sheets

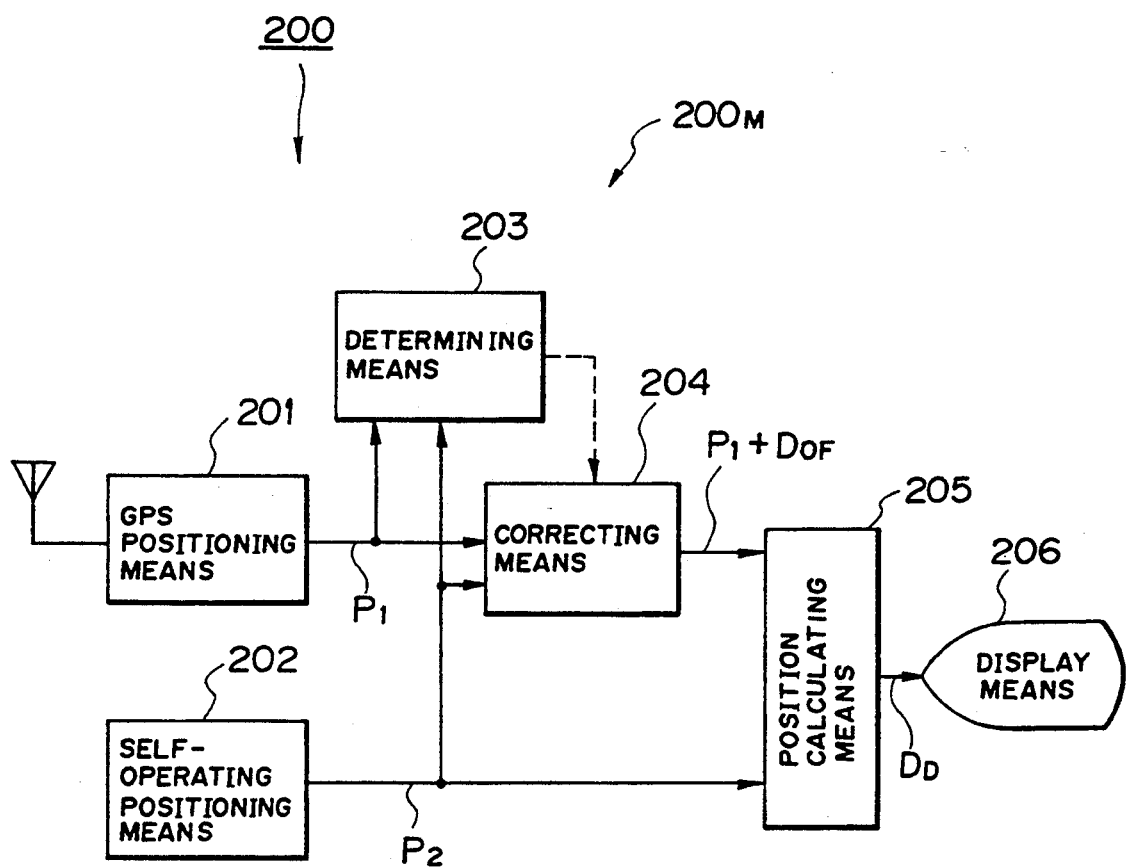
F I G. 2

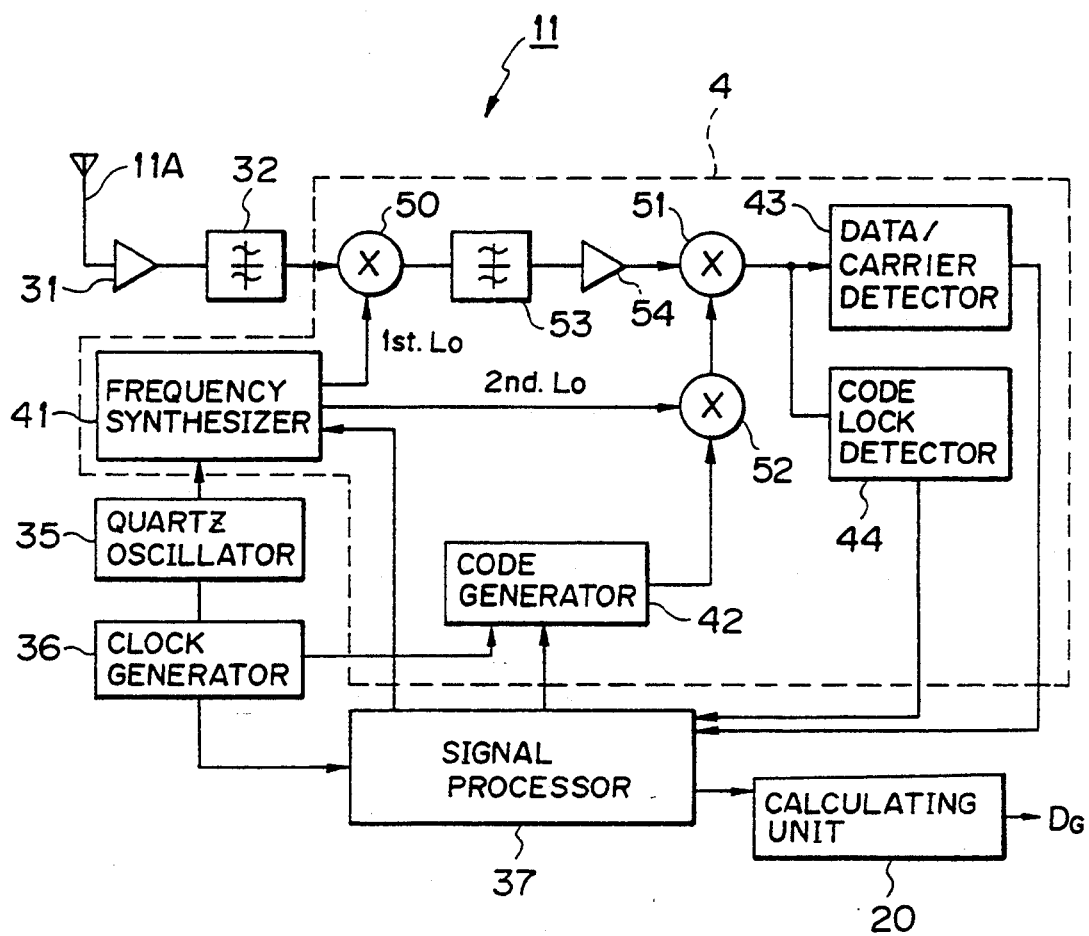

NAVIGATION SYSTEM

BACKGROUND OF THE INVENTION

1. Field of the Invention

The present invention relates to a navigation system, and more particularly to a navigation system incorporating a global positioning system (GPS) receiver and a self-operating sensor for determining the position of a reception point or a mobile object such as an automobile in a global geometrical region, the navigation system having a means for correcting an error of positional data.

2. Description of the Prior Art

There are known navigation systems incorporating global positioning systems (GPS) for navigating various mobile objects such as automobiles, airplanes, ships, or the like in a global geometrical region. Typically, such a navigation system on a mobile object has a GPS receiver which receives radio waves transmitted from three or more GPS satellites, determines the position of a reception point where its radio-wave receiver has received the radio waves, based on quasi-distance data between the GPS satellites and the reception point, including a time offset of the receiver, and positional data of the GPS satellites, and outputs the data about the determined position. Since, however, the radio waves from the GPS satellites may not necessarily be received under good conditions because of receiving environments and weather conditions, some navigation systems which incorporate a GPS receiver are also combined with a self-operating sensor which produces the positional data of its own for more accurate navigation. The self-operating sensor for use in automobile navigation systems may comprise an orientation sensor such as a geomagnetic sensor or a gas-rate gyroscope, or a speed sensor such as a sensor for detecting the rotational speed of a crankshaft.

One known navigation system comprising a GPS receiver and a self-operating sensor is disclosed in Japanese laid-open patent publications Nos. 63-247613 and 63-223585, for example.

The navigation system disclosed in the former publication selects GPS data from the GPS receiver when the position determined based on the GPS positional data is located within an error range of the navigation process of the self-operating sensor, and selects the positional data from the self-operating sensor when the position determined based on the GPS positional data is located outside the error range of the navigation process of the self-operating sensor. However, if the difference between the GPS data from the GPS receiver and the positional data from the self-operating sensor is gradually increased, then the mobile object will eventually be navigated only on the basis of the positional data from the self-operating sensor, with the GPS data being not used at all. When only the positional data from the self-operating sensor is used, the navigation system suffers the disadvantage of the self-operating sensor, i.e., an accumulation of errors due to an increase in the distance by which the mobile object has traveled or in the time in which it has traveled.

According to the navigation system disclosed in the latter publication, previous and present GPS data from the GPS receiver are compared with each other, and when present GPS data that is estimated from the previous GPS data deviates from the actual present GPS data beyond a predetermined range, the actual present GPS data is ignored, and positional data from the self-operating sensor is selected for navigation. This navigation system also has its own drawbacks. Specifically, it may possibly produce an error of several hundreds meters if intentional error information known as selective availability (SA) is contained in positional data from the GPS satellites. Even if the positional data error lies within a predetermined range allowing the GPS data to be used for navigation, a path of movement of the mobile object, as determined by the GPS data, is displayed on a display unit as a plurality of short discrete line segments, but not as a continuous line. Consequently, the produced positional data tends to be inaccurate, and unable to be matched to map data.

Furthermore, in the event that a different combination of GPS satellites is used for producing GPS data, or a positioning mode switches between two- and three-dimensional positioning modes, or the ratio waves from the GPS satellites suffer the multipath effect, the path of movement of the mobile object displayed on the display unit suddenly shifts over an interval which corresponds to an actual distance ranging from several tens to hundreds meters.

SUMMARY OF THE INVENTION

It is an object of the present invention to provide a navigation system incorporating a GPS receiver and a self-operating sensor for navigating a reception point or a mobile object such as an automobile accurately at all times in a global geometrical region and displaying the position of the mobile object accurately on a display unit, based on effective use of GPS data from the GPS receiver.

According to the present invention, there is provided a navigation system for use on a mobile object, comprising GPS positioning means for receiving radio waves from GPS satellites, determining the present position of the mobile object based on the received radio waves, and outputting first positional data indicative of the determined position, self-operating positioning means having a sensor on the mobile object for determining the present position of the mobile object and outputting second positional data indicative of the determined position, determining means for comparing the first positional data and the second positional data to determine whether or not the difference between the present position of the mobile object as indicated by the first positional data and the present position of the mobile object as indicated by the second positional data is equal to or greater than a predetermined value, and correcting means for adding an offset value to the first positional data if the difference is equal to or greater than the predetermined value.

According to the present invention, there is also provided a navigation system for use on a mobile object, comprising GPS positioning means for receiving radio waves from GPS satellites, determining the present position of the mobile object based on the received radio waves, and outputting first positional data indicative of the determined position, self-operating positioning means having a sensor on the mobile object for determining the present position of the mobile object and outputting second positional data indicative of the determined position, determining means for comparing the first positional data and the second positional data to determine whether or not the difference between the present position of the mobile object as indicated by the first positional data and the present position of the mobile object as indicated by the second positional data is equal to or greater than a predetermined value, correcting means for adding an offset value to the first positional data if the difference is equal to or greater than the predetermined value, position calculating means for outputting display data to display the present position of the mobile object based on the first positional data as corrected by the correcting means, and display means for displaying the present position of the mobile object based on the display data.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2 is a block diagram also showing the principles of the present invention;

FIG. 4 is a detailed block diagram of a GPS receiver of the navigation system;

DETAILED DESCRIPTION OF THE PREFERRED EMBODIMENTS

Figure 1:
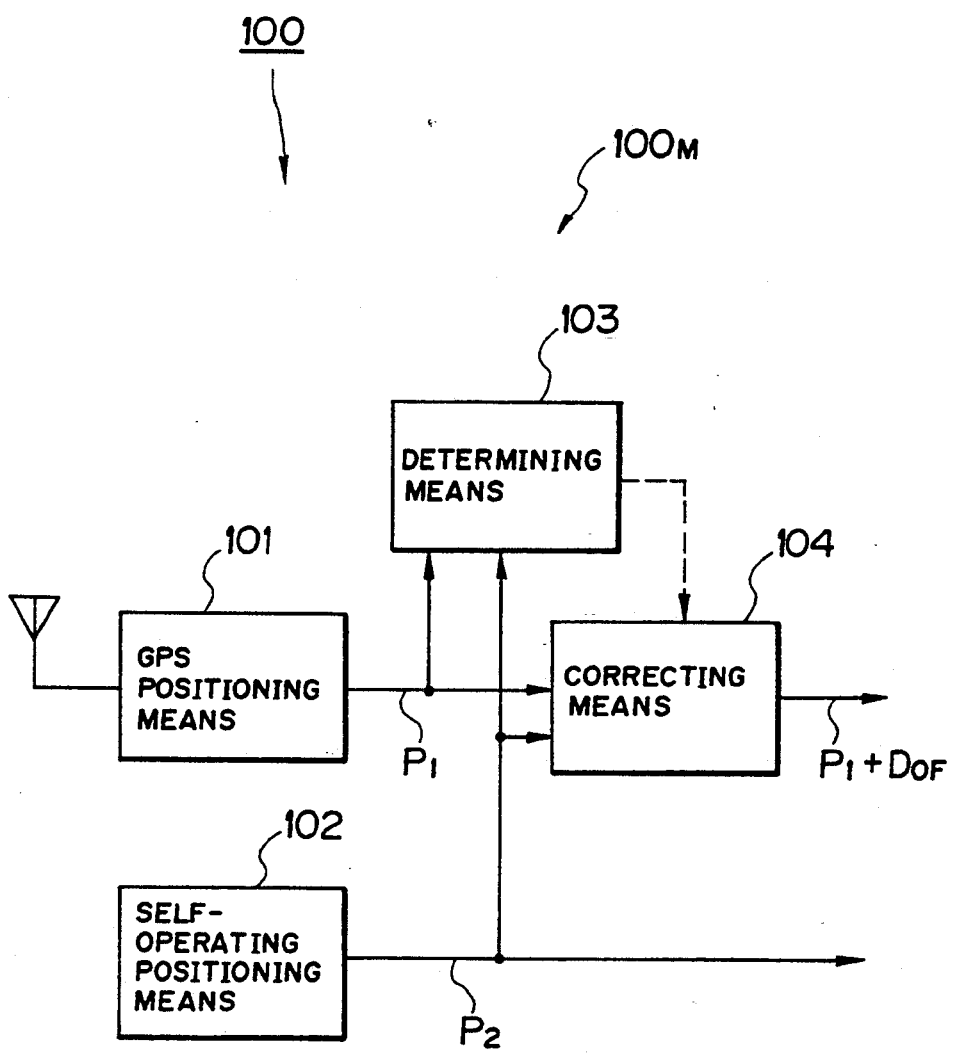
FIG. 1 is a block diagram showing the principles of the present invention.

FIG. 1 shows the principles of the present invention. According to the principles shown in FIG. 1, a navigation system 100 on a mobile object 100M includes a GPS positioning means 101 for receiving radio waves from GPS satellites, determining the present position of the mobile object 100M based on the received radio waves, and outputting first positional data $P_1$ indicative of the determined position, a self-operating positioning means 102 having a sensor on the mobile object 100M for determining the present position of the mobile object 100M and outputting second positional data $P_2$ indicative of the determined position, a determining means 103 for comparing the first positional data $P_1$ and the second positional data $P_2$ to determine whether or not the difference between the present position of the mobile object 100M as indicated by the first positional data $P_1$ and the present position of the mobile object 100M as indicated by the second positional data $P_2$ is equal to or greater than a predetermined value, and a correcting means 104 for adding an offset value $D_{OF}$ to the first positional data $P_1$ if the difference is equal to or greater than the predetermined value.

In operation, the GPS positioning means 101 determines the present position of the mobile object 100M based on the received radio waves from the GPS satellites, and outputs the first positional data $P_1$ indicative of the determined position. The self-operating positioning means 102 determines the present position of the mobile object 100M with the sensor, and outputs the second positional data $P_2$ indicative of the determined position. The determining means 103 compares the first positional data $P_1$ and the second positional data $P_2$ to determine whether or not the difference between the present position of the mobile object 100M as indicated by the first positional data $P_1$ and the present position of the mobile object 100M as indicated by the second positional data $P_2$ is equal to or greater than a predetermined value. The correcting means 104 adds an offset value $D_{OF}$ to the first positional data $P_1$ if the difference is equal to or greater than the predetermined value. Therefore, if the difference between the present position of the mobile object 100M as indicated by the first positional data $P_1$ and the present position of the mobile object 100M as indicated by the second positional data $P_2$ is equal to or greater than the predetermined value, i.e., if the first positional data $P_1$ from the GPS positioning means 101 contains a large error, then the first positional data $P_1$ is corrected by the offset value $D_{OF}$ for accurate navigation.

FIG. 2 also shows the principles of the present invention.

According to the principles shown in FIG. 2, a navigation system 200 on a mobile object 200M includes a GPS positioning means 201 for receiving radio waves from GPS satellites, determining the present position of the mobile object 200M based on the received radio waves, and outputting first positional data $P_1$ indicative of the determined position, a self-operating positioning means 202 having a sensor on the mobile object 200M for determining the present position of the mobile object 200M and outputting second positional data $P_2$ indicative of the determined position, a determining means 203 for comparing the first positional data $P_1$ and the second positional data $P_2$ to determine whether or not the difference between the present position of the mobile object 200M as indicated by the first positional data $P_1$ and the present position of the mobile object 200M as indicated by the second positional data $P_2$ is equal to or greater than a predetermined value, a correcting means 204 for adding an offset value $D_{OF}$ to the first positional data $P_1$ if the difference is equal to or greater than the predetermined value, a position calculating means 205 for outputting display data $D_D$ to display the present position of the mobile object 200M based on the first positional data $P_1$ as corrected by the correcting means 204, and a display means 206 for displaying the present position of the mobile object 200M based on the display data $D_D$.

In operation, the GPS positioning means 201 determines the present position of the mobile object 200M based on the received radio waves from the GPS satellites, and outputs the first positional data $P_1$ indicative of the determined position. The self-operating positioning means 202 determines the present position of the mobile object 200M with the sensor, and outputs the second positional data $P_2$ indicative of the determined position. The determining means 203 compares the first positional data $P_1$ and the second positional data $P_2$ to determine whether or not the difference between the present position of the mobile object 200M as indicated by the first positional data $P_1$ and the present position of the mobile object 200M as indicated by the second positional data $P_2$ is equal to or greater than a predetermined value. The correcting means 204 adds an offset value $D_{OF}$ to the first positional data $P_1$ if the difference is equal to or greater than the predetermined value. The position calculating means 205 outputs display data $D_D$ to display the present position of the mobile object 200M based on the first positional data $P_1$ as corrected by the correcting means 204. The display means 206 displays the present position of the mobile object 200M based on the display data $D_D$. Therefore, if the difference between the present position of the mobile object 100M as indicated by the first positional data $P_1$ and the present position of the mobile object 100M as indicated by the second positional data $P_2$ is equal to or greater than the predetermined value, i.e., if the present position is displayed by the display means 206 based on the first positional data $P_1$ from the GPS positioning means 201, the first positional data $P_1$ is corrected by the offset value $D_{OF}$, and the display means 206 displays an accurate continuous path of movement of the mobile unit 200M which would otherwise be composed of discrete line segments.

Figure 3A:
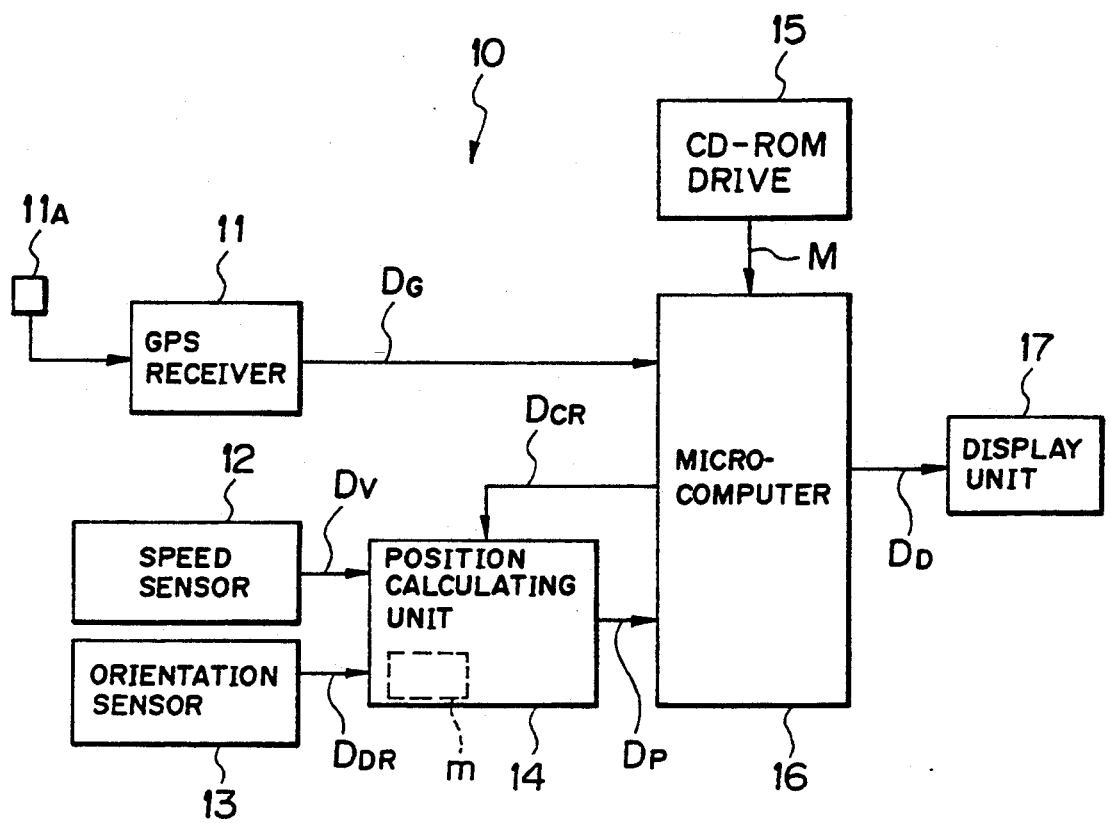
FIGS. 3A and 3B are block diagrams of a navigation system according to the present invention.
Figure 3B:
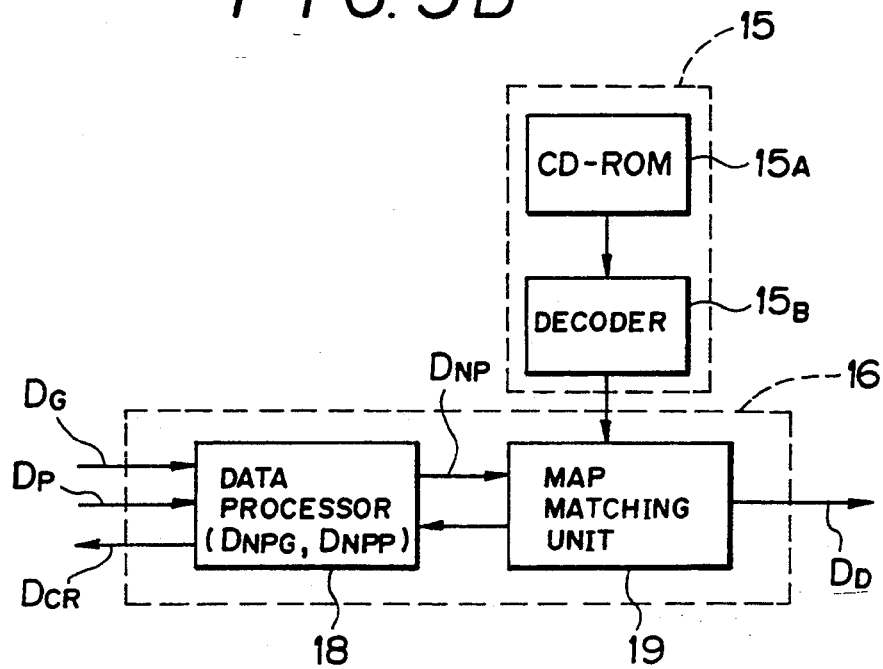

FIGS. 3A and 3B show in block form a navigation system according to the present invention. By way of example, the navigation system shown in FIGS. 3A and 3B is incorporated in an automobile.

As shown in FIG. 3A, the navigation system, generally designated by the reference numeral 10, comprises a GPS receiver 11 for receiving radio waves from GPS satellites through a GPS antenna 11A and outputting GPS positional data $D_G$ based on the received radio waves, a speed sensor 12 for detecting the speed of travel of the automobile based on the rotational speed of the drive shaft of the automobile and outputting speed data $D_V$ indicative of the detected speed, an orientation sensor 13 such as a gas rate gyroscope or a geomagnetic sensor for outputting orientation data $D_{DR}$ indicative of the orientation of the automobile, a position calculating unit 14 for outputting positional data $D_P$ based on the speed data $D_V$ from the speed sensor 12 and the orientation data $D_{DR}$ from the orientation sensor 13, the position calculating unit 14 having a memory m for storing previous GPS data $D_G$, a microcomputer 16 for reading map data M from a CD-ROM drive 15 based on the GPS data $D_G$ and the positional data $D_P$, matching positional data to the map data M, outputting display data $D_D$ to display the position of the automobile on a map, and outputting corrective data $D_{CR}$ as an offset value to correct the positional data $D_P$ to the position calculating unit 14, and a display unit 17 for displaying the position of the automobile on the map based on the display data $D_D$. The GPS receiver 11 corresponds to the GPS positioning means 101 shown in FIG. 1 or the GPS positioning means 201 shown in FIG. 2. The speed sensor 12, the orientation sensor 13, and the position calculating unit 14 jointly correspond to the self-operating positioning means 102 shown in FIG. 1 or the self-operating positioning means 202 shown in FIG. 2.

As shown in FIG. 3B, a CD-ROM 15A storing map data M is loaded in the CD-ROM drive 15. The map data M read from the CD-ROM drive 15 is outputted through a decoder 15B to the microcomputer 16. The map data M stored in the CD-ROM 15A contains road data $D_R$ representing roads.

As shown in FIG. 3B, the microcomputer 16 comprises a data processor 18 for outputting present position data $D_{NP}$ indicating the present position of the automobile based on the GPS data $D_G$ and the positional data $D_P$, and also outputting the corrective data $D_{CR}$, and a map matching unit 19 for matching the present position data $D_{NP}$ to the map data M from the CD-ROM drive 15, and outputting the display data $D_D$. The data processor 18 corresponds to the determining means 103 and the correcting means 104 shown in FIG. 1 or the determining means 203, the correcting means 204, and the position calculating means 205 shown in FIG. 2.

The GPS receiver 11 will be described in detail below with reference to FIG. 4.

The GPS antenna 11A is connected to a GPS receiver unit 40 through a preamplifier 31 and a bandpass filter 32. The GPS receiver 11 has a quartz oscillator 35 for producing a reference frequency signal as a timing control signal, and a clock generator 36 for generating a clock signal based on the reference frequency signal, a signal processor 37 for processing various signals using the clock signal as an operation timing signal, and a calculating unit 20 for generating and outputting GPS positional data $D_G$ based on an output signal from the signal processor 37.

The GPS receiver unit 40 has a frequency synthesizer 41 responsive to the reference frequency signal from the quartz oscillator 35 and a signal from the signal processor 37 for generating a signal having the same pattern as the data relative to the signal carrier of the GPS satellites, the position of the GPS satellites, and the clocks in the GPS satellites. A code generator 42 generates a code signal having the same pattern as distance signals from the GPS satellites in response to the clock signal from the clock generator 36 and the signal from the signal processor 37. Based on output signals from the frequency synthesizer 41 and the code generator 42, a data/carrier detector 43 detects, by way of correlation detection, data relative to the clocks in the GPS satellites and the orbits of the GPS satellites, and the signal carrier of the GPS satellites. A code lock detector 44 detects, by way of correlation detection, the distance signals with the code signal from the code signal generator 42.

Reference numerals 50, 51 and 52 denote mixers, respectively, reference numeral 53 denotes a band pass filter and reference numeral 54 denotes an amplifier.

Figure 5:
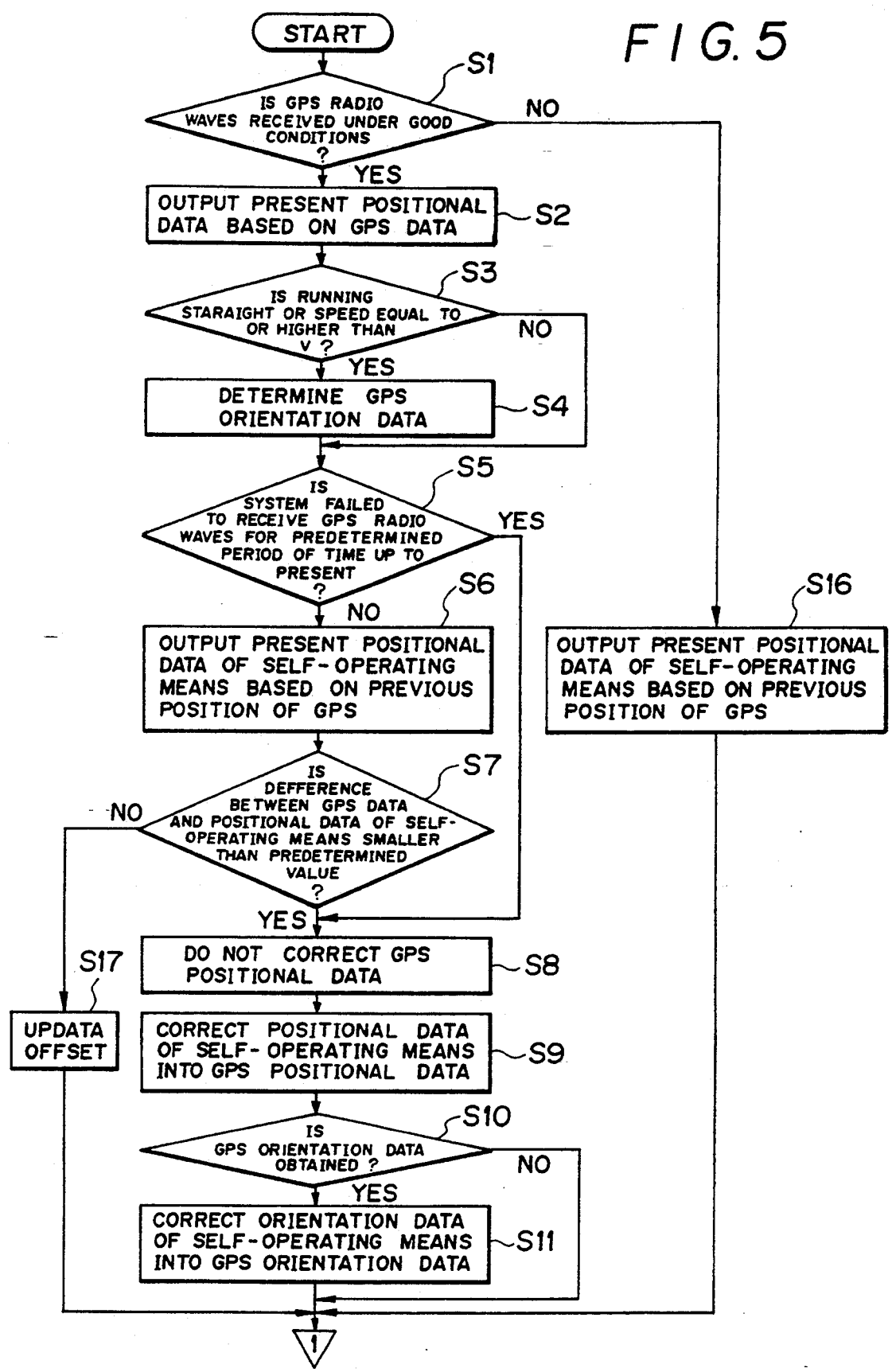
FIGS. 5 and 6 are a flowchart of an operation sequence of the navigation system.
Figure 6:
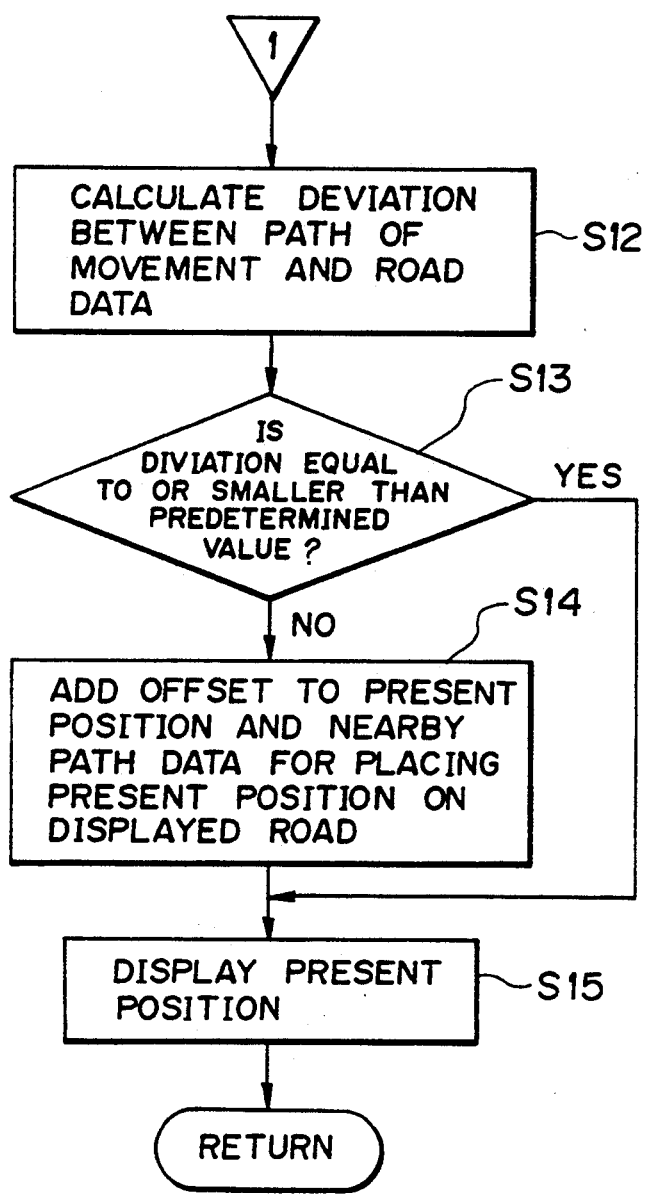

An operation sequence of the navigation system shown in FIGS. 3A, 3B, and 4 will be described below with reference to FIGS. 5 and 6.

After the navigation system starts to operate, the microcomputer 16 determines, in a step S1, whether the radio waves from the GPS satellites are being received under good conditions by the GPS antenna 11A. If the radio waves from the GPS satellites are not being received under good conditions by the GPS antenna 11A, then the position calculating unit 14 outputs present positional data $D_P$ based on previous GPS data $D_G$ through the self-operating positioning means as a reference point or standard point, and the data processor 18 outputs present positional data $D_{NP}$ based on the positional data $D_P$ in a step S16. After the step S16, control goes to a step S12.

If the radio waves from the GPS satellites are being received under good conditions by the GPS antenna 11A, then the data processor 18 outputs, as present positional data $D_{NP}$, present positional data $D_{NPG}$ based on the GPS data $D_G$ from the GPS receiver 11 in a step S2.

The microcomputer 16 determines, in a step S3, whether the automobile is running straight or the speed of travel of the automobile is equal to or higher than a predetermined speed v. If the automobile is running straight or the speed of travel of the automobile is equal to or higher than the predetermined speed v, then the microcomputer 16 determines GPS orientation data based on the GPS data $D_G$ in a step S4. If the automobile is not running straight or the speed of travel of the automobile is lower than the predetermined speed v, then control jumps from the step S3 to a step S5.

In the step S5, the data processor 18 determines whether the GPS receiver 11 has been unable to receive the radio waves from the GPS satellites for a predetermined period of time or more immediately up to the present time. If the GPS receiver 11 has been unable to receive the radio waves from the GPS satellites for the predetermined period of time or more immediately up to the present time, then control jumps to a step S8.

If the GPS receiver 11 has been receiving the radio waves from the GPS satellites for the predetermined period of time or more immediately up to the present time, then the data processor 18 outputs, in a step S6, present positional data $D_{NP}$ based on the present positional data $D_P$ based on the previous GPS data $D_G$ stored in the position calculating unit 14.

Then, the data processor 18 compares the present position based on the GPS data $D_G$ and the present position based on the positional data $D_P$ to determine whether or not the difference between the compared positions is smaller than a predetermined value in a step S7. If the difference between the present position based on the GPS data $D_G$ and the present position based on the positional data $D_P$ is smaller than the predetermined value, then control goes to the step S8.

Figure 7:
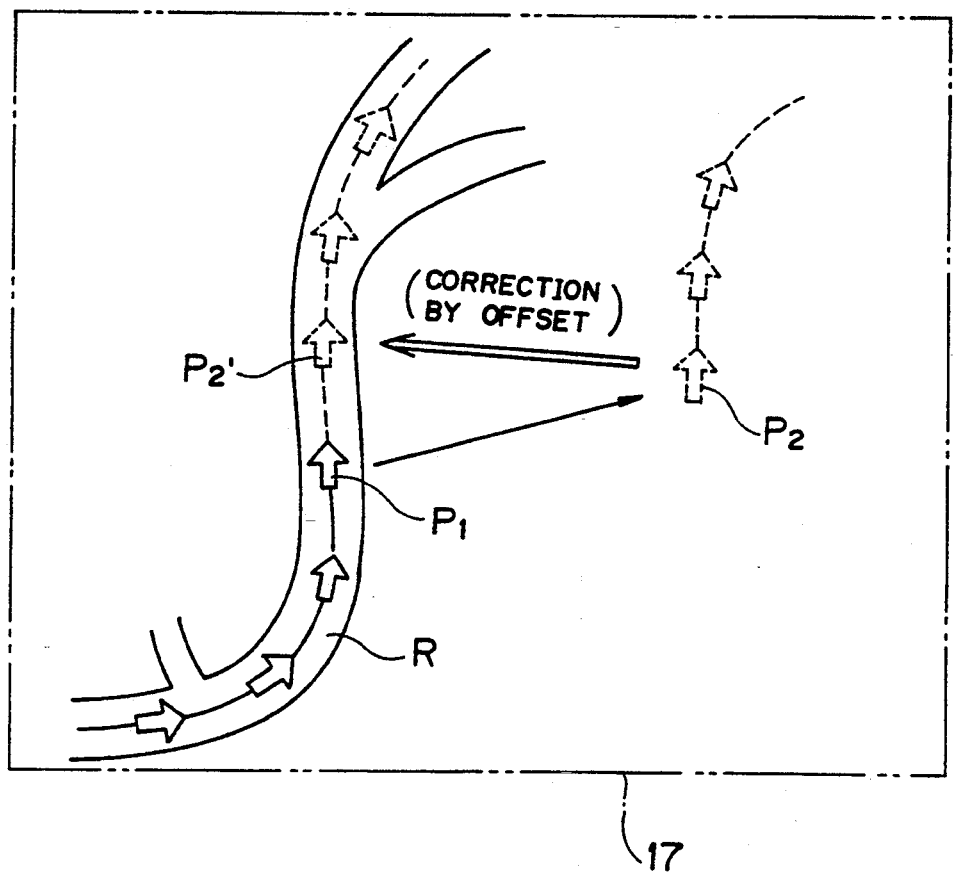
FIG. 7 is a diagram showing the manner in which a displayed position is corrected in the operation sequence.

If the difference between the present position based on the GPS data $D_G$ and the present position based on the positional data $D_P$ is equal to or greater than the predetermined value, then the data processor 18 updates, in a step S17, the offset value into an offset value $D_{OF}$ corresponding to the difference between the present position based on the GPS data $D_G$ and the present position based on the positional data $D_P$. Thereafter, control goes from the step S17 to the step S12. Consequently, the present positional data $D_{NPG}$ based on subsequent GPS data $D_G$ is corrected with the offset data $D_{OF}$. More specifically, if the displayed present position suddenly jumps from a previous automobile position $P_1$ to a present automobile position $P_2$, as shown in FIG. 7, then there is produced a deviation or error between the present position $P_2$ based on the GPS data $D_G$ and a present position $P_2'$ based on the positional data $D_P$, with the error being equal to or greater than a predetermined value. Therefore, the map matching unit 19 corrects the present automobile position $P_2$ with the offset data $D_{OF}$, thus correcting the present position $P_2$ based on the GPS data $D_G$ into the present position $P_2'$ based on the positional data $D_P$. The map matching unit 19 corrects the present automobile position $P_2$ with the offset data $D_{OF}$ until the error becomes equal to or smaller than a predetermined value or the offset data $D_{OF}$ is updated again.

If the difference between the present position based on the GPS data $D_G$ and the present position based on the positional data $D_P$ is smaller than the predetermined value, then the present positional data $D_{NPG}$ based on the GPS data $D_G$ is not corrected in the step S8. The data processor 18 then replaces present positional data $D_{NPP}$ based on the positional data $D_P$ stored in the position calculating unit 14 with the present positional data $D_{NPG}$ based on the GPS data $D_G$, and stores the present positional data $D_{NPG}$ in the memory m in a step S9.

Thereafter, the data processor 18 determines whether GPS orientation data is obtained from the GPS data $D_G$ in a step S10. If not, then control jumps to the step S12.

If GPS orientation data is obtained, then the data processor 18 corrects the orientation data based on the positional data $D_P$ into the GPS orientation data with corrective data $D_{CR}$ in a step S11.

The map matching unit 19 calculates a deviation or error between the path of movement of the automobile based on the present positional data $D_{NP}$ from the data processor 18 and the road data $D_R$ in the map data M from the CD-ROM drive 15 in the step S12. The map matching unit 19 then determines, in a next step S13, whether the deviation or error is equal to or smaller than a predetermined value. If the deviation is equal to or smaller than the predetermined value, then the map matching unit 19 outputs display data $D_D$ based on the present positional data $D_{NP}$ to the display unit 17, which displays the position of the automobile in the displayed map in a step S15.

If the deviation is greater than the predetermined value in the step S13, then the map matching unit 19 adds, in a step S14, an offset value or corrective value to the present position and nearby path data so that the displayed present position of the automobile will be located on the road in the displayed map based on the road data $D_R$. The display unit 17 now displays the accurate automobile position in the map in the step S15. More specifically, as described above with reference to FIG. 7, if the displayed present position suddenly jumps from a previous automobile position $P_1$ to a present automobile position $P_2$, then there is produced a deviation or error between the present position $P_2$ and a road R represented by the road data $D_R$, with the error being equal to or greater than a predetermined value. Therefore, the map matching unit 19 adds an offset to the present automobile position $P_2$, thus correcting the present position $P_2$ into a position $P_2'$ which is assumed to be a correct position at the time. Therefore, the displayed path of movement of the automobile is corrected into a smooth path which approximates an actual road.

Heretofore, if the displayed present automobile position based on the GPS data $D_G$ jumps to a distant location or contains a large error, then it has been customary to ignore the present positional data $D_{NP}$ based on the GPS data $D_G$. According to the present invention, however, insofar as certain conditions in which the radio waves from the GPS satellites are received, e.g., the intensity of the received radio waves and the number of GPS satellites from which the radio waves are received, are satisfied, the navigation system can use the GPS data $D_G$. Therefore, the GPS data $D_G$ can effectively utilized for navigation. Moreover, the navigation system can navigate the automobile accurately at all times because the present positional data $D_{NP}$ is corrected using the road data $D_R$ in the step S14.

If the deviation or error between the present positional data $D_{NPP}$ based on the positional data $D_P$ and the present positional data $D_{NPG}$ based on the GPS data $D_G$ is small, then the position calculating unit 14 replaces the present positional data $D_{NPP}$ with the present positional data $D_{NPG}$, and determines the positional data $D_P$ based on the present positional data $D_{NPG}$. Thus, errors of the positional data $D_P$ are prevented from being accumulated.

The above process is based on the assumption that the GPS receiver 11 is able to receive the radio waves from the GPS satellites at all times. If the GPS receiver 11 is unable to receive radio waves from the GPS satellites continuously for a predetermined period of time or longer, as when the automobile is running through a long tunnel, for example, then the positional data $D_P$ from the position calculating unit 14 is considered to contain accumulated errors the first time when the GPS receiver 11 becomes able to receive the radio waves from the GPS satellites subsequently. At this time, the data processor 18 is caused to function as a correction inhibiting means for preventing the present positional data $D_{NPG}$ from being corrected with the present positional data $D_{NPP}$. This operation is equivalent to a flow from the step S5 (YES) to the step S8. In the event that the present positional data $D_{NPG}$ deviates largely from the road data $D_R$ in this case, the present positional data $D_{NPG}$ is also corrected using the road data $D_R$ in the step S14.

Although a certain preferred embodiment of the present invention has been shown and described in detail, it should be understood that various changes and modifications may be made therein without departing from the scope of the appended claims.

What is claimed is:

1. A navigation system for use on a mobile object, comprising:
   GPS positioning means for receiving radio waves from GPS satellites, determining the present position of the mobile object based on the received radio waves, and outputting first positional data indicative of the determined position;
   self-operating positioning means having a sensor on the mobile object for determining the present position of the mobile object and outputting second positional data indicative of the predetermined position;
   determining means for comparing said first positional data and said second positional data to determine whether or not the difference between the present position of the mobile object as indicated by said first positional data and the present position of the mobile object as indicated by said second positional data is equal to or greater than a predetermined value; and
   correcting means for adding an offset value to said first positional data so that said first positional data becomes coincident with said second positional data if said difference is equal to or greater than said predetermined value.

2. A navigation system according to claim 1, wherein said self-operating positioning means comprises memory means for storing a positional data determined in a previous positioning cycle and means for determining and outputting the second positional data determined in a present positioning cycle based on said stored positional data, and said correcting means replaces said stored positional data with said first positional data if said different is smaller than said predetermined value.

3. A navigation system according to claim 1, wherein said self-operating positioning means comprises means for correcting second orientation data contained in said second positional data with first orientation data contained in said first positional data.

4. A navigation system according to claim 1, wherein said correcting means includes correction inhibiting means for preventing said first positional data from being corrected with said offset value the first time when said GPS positioning means outputs the first positional data after said GPS positioning means has failed to output said first positional data continuously for a predetermined period of time.

5. A navigation system according to claim 1, wherein said self-operating positioning means comprises means for outputting present positional data based on previous data by GPS positioning means.

6. A navigation system according to claim 1, wherein said offset value comprises a difference between said first positional data and said second positional data.

7. A navigation system for use on a mobile object, comprising:
   GPS positioning means for receiving radio waves from GPS satellites, determining the present position of the mobile object based on the received radio waves, and outputting first positional data indicative of the determined position;
   self-operating positioning means having a sensor on the mobile object for determining the present position of the mobile object and outputting second positional data indicative of the determined position;
   determining means for comparing said first positional data and said second positional data to determine whether or not the difference between the present position of the mobile object as indicated by said first positional data and the present position of the mobile object as indicated by said second positional data is equal to or greater than a predetermined value;
   correcting means for adding an offset value to said first positional data so that said first positional data becomes coincident with said second positional data if the difference is equal to or greater than said predetermined value;
   position calculating means for outputting display data to display the present position of the mobile object based on said first positional data as corrected by said correcting means; and
   display means for displaying the present position of the mobile object based on said display data.

8. A navigation system according to claim 7, wherein said self-operating positioning means comprises memory means for storing a positional data determined in a previous positioning cycle and means for determining and outputting the second positional data determined in a present positioning cycle based on said stored positional data, and said correcting means replaces said stored positional data with said first positional data if said difference is smaller than said predetermined value.

9. A navigation system according to claim 7, wherein said self-operating positioning means comprises means for correcting second orientation data contained in said second positional data with first orientation data contained in said first positional data.

10. A navigation system according to claim 7, wherein said correcting means includes correction inhibiting means for preventing said first positional data from being corrected with said offset value the first time when said GPS positioning means outputs the first positional data after said GPS positioning means has failed to output said first positional data continuously for a predetermined period of time.

11. A navigation system according to claim 7, wherein said self-operating positioning means comprises means for outputting present positional data based on previous data by GPS positioning means.

12. A navigation system according to claim 7, wherein said offset value comprises a difference between said first positional data and said second positional data.

13. A navigation system according to claim 7, further comprising map matching means comprising, map data storing unit for storing map data including road data; and display position correcting means for correcting the present position of the mobile object to be displayed in accordance with the road data.

14. A navigation system according to claim 13, wherein said display position correcting means corrects the present position of the mobile object so that the display position locates on the road in the displayed map if the deviation of the present position from the position of the road data exceeds a predetermined deviation value.

* * * * *